United States Patent
Horiishi et al.

(10) Patent No.: US 11,414,323 B2
(45) Date of Patent: Aug. 16, 2022

(54) TREATMENT METHOD FOR REDUCING CARBON DIOXIDE EMISSION OF COMBUSTION EXHAUST GAS

(71) Applicants: SENTEC CO. LTD., Tokyo (JP); Nanao Horiishi, Kawasaki (JP)

(72) Inventors: Nanao Horiishi, Kawasaki (JP); Hiromoto Ueno, Tokyo (JP)

(73) Assignees: SENTEC CO. LTD., Tokyo (JP); Nanao Horiishi, Kawasaki (JP)

( * ) Notice: Subject to any disclaimer, the term of this patent is extended or adjusted under 35 U.S.C. 154(b) by 454 days.

(21) Appl. No.: 16/619,534

(22) PCT Filed: Apr. 11, 2019

(86) PCT No.: PCT/JP2019/015877
§ 371 (c)(1),
(2) Date: Dec. 5, 2019

(87) PCT Pub. No.: WO2019/225202
PCT Pub. Date: Nov. 28, 2019

(65) Prior Publication Data
US 2020/0131045 A1   Apr. 30, 2020

(30) Foreign Application Priority Data
May 19, 2018 (JP) .............................. JP2018-096686

(51) Int. Cl.
*B01D 53/18* (2006.01)
*B01D 53/62* (2006.01)
(Continued)

(52) U.S. Cl.
CPC .............. *C01D 1/22* (2013.01); *B01D 53/18* (2013.01); *B01D 53/62* (2013.01); *B01D 53/73* (2013.01);
(Continued)

(58) Field of Classification Search
CPC .. B01D 2257/504; B01D 53/73; B01D 53/62; B01D 2258/0283; B01D 53/18;
(Continued)

(56) References Cited

FOREIGN PATENT DOCUMENTS

| JP | S52-44793 A | 4/1977 |
| JP | H02-160618 A | 6/1990 |

(Continued)

OTHER PUBLICATIONS

International Search Report dated Jun. 4, 2019 for PCT/JP2019/015877 and English translation.

*Primary Examiner* — Timothy C Vanoy
(74) *Attorney, Agent, or Firm* — Lucas & Mercanti, LLP

(57) ABSTRACT

A treatment method for reducing carbon dioxide emission of combustion exhaust gas includes: a caustic soda synthesis step; a treatment step of reducing carbon dioxide emission of combustion exhaust gas; and a recycling step. In the caustic soda synthesis step, a natural sodium carbonate aqueous solution ($Na_2CO_3$) prepared by dissolving natural sodium carbonate ore powder composed of $Na_2CO_3$ and $NaHCO_3$ in a caustic soda aqueous solution is used to generate a caustic soda aqueous solution and calcium carbonate precipitate by a causticization reaction with slaked lime, and solid-liquid separation is performed to obtain a synthetic caustic soda aqueous solution. In the treatment step, the synthetic caustic soda aqueous solution and purified combustion exhaust gas are brought into gas-liquid countercurrent contact so that carbon dioxide in the exhaust gas is absorbed by the synthetic caustic soda aqueous solution and immobilized as sodium carbonate.

5 Claims, 3 Drawing Sheets

(51) Int. Cl.
*B01D 53/73* (2006.01)
*B01D 53/78* (2006.01)
*C01D 1/22* (2006.01)
*C01D 7/12* (2006.01)

(52) U.S. Cl.
CPC ............ *B01D 53/78* (2013.01); *C01D 7/126* (2013.01); *B01D 2252/10* (2013.01); *B01D 2257/504* (2013.01); *B01D 2258/0283* (2013.01)

(58) Field of Classification Search
CPC ............ B01D 53/78; B01D 2251/304; B01D 2252/10; B01D 2251/604; C01D 7/10; C01D 1/22; C01D 7/126; C01D 7/22; C01F 11/02; Y02C 20/40
See application file for complete search history.

(56) References Cited

FOREIGN PATENT DOCUMENTS

| | | |
|---|---|---|
| JP | H06-263433 A | 9/1994 |
| JP | H11-246217 A | 9/1999 |
| JP | 2006273600 A | 10/2006 |
| JP | 4747382 B1 | 5/2011 |
| JP | 2011213528 A | 10/2011 |
| JP | 2013066887 A | 4/2013 |

FIG. 2

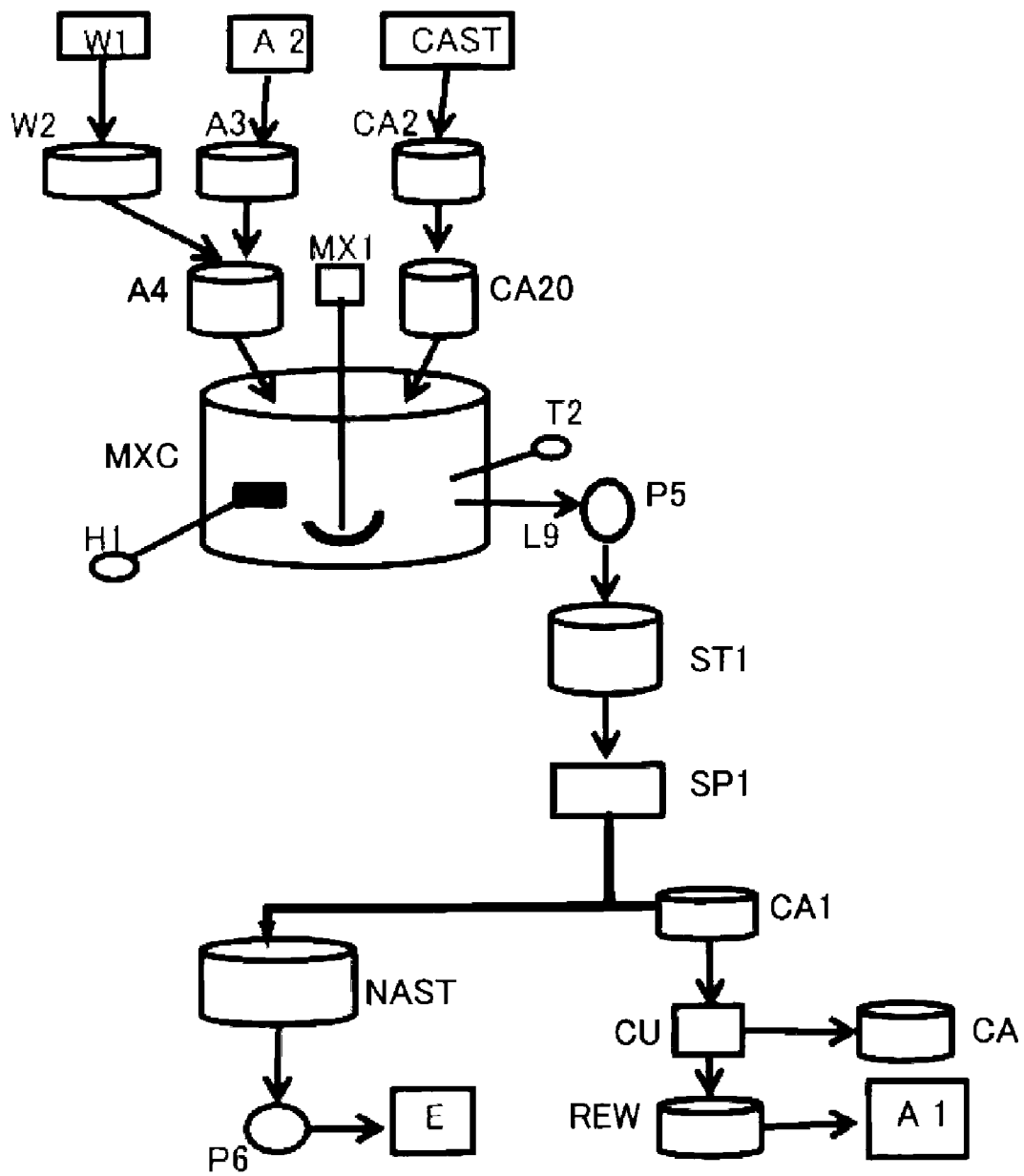

MXC: STIRRING-MIXING REACTION TANK
MX1: STIRRING DEVICE
T2: TEMPERATURE MEASURING DEVICE
H1: HEATING DEVICE
W1: SODIUM CARBONATE AQUEOUS SOLUTION STORAGE TANK
W2: SODIUM CARBONATE AQUEOUS SOLUTION MEASURING TANK
A2: NATURAL SODIUM CARBONATE AQUEOUS SOLUTION STORAGE TANK
A3: NATURAL SODIUM CARBONATE AQUEOUS SOLUTION MEASURING TANK
CA2: SLAKED LIME POWDER MEASURING TANK
A4: SODIUM CARBONATE AQUEOUS SOLUTION FEEDER
CA20: SLAKED LIME POWDER FEEDER
L9: STIRRING-MIXING REACTION TREATMENT LIQUID EXTRACTION LINE
P5: STIRRING-MIXING REACTION TREATMENT LIQUID TRANSFER PUMP

NAST: SYNTHETIC CAUSTIC SODA AQUEOUS SOLUTION REMOVAL TANK
P6: TRANSFER PUMP
E: SYNTHETIC CAUSTIC SODA AQUEOUS SOLUTION STORAGE TANK
CA1: CALCIUM CARBONATE PRECIPITATE STORAGE TANK
CU: CALCIUM CARBONATE REFINING TREATMENT STEP
　　　　　　　　　　　　　　(WASHING AND DRYING) STEP
REW: ALKALINE FLUSH DRAINAGE STORAGE TANK
A1: AQUEOUS SOLUTION PREPARATION STEP OF NATURAL SODIUM CARBONATE
CA: LIGHT CALCIUM CARBONATE STORAGE TANK
CAST: SLAKED LIME POWDER STORAGE TANK
ST1: STIRRING-MIXING REACTION TREATMENT LIQUID STORAGE TANK
SP1: SOLID-LIQUID SEPARATION STEP

FIG. 3

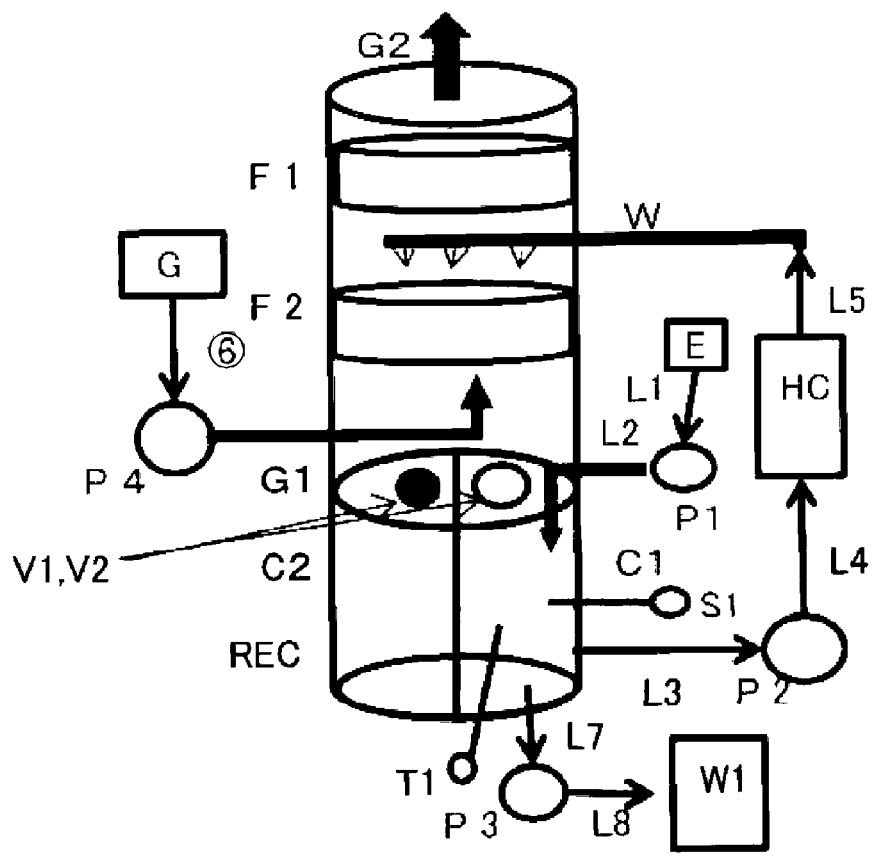

REC; GAS-LIQUID CONTACT REACTION TOWER
C1; NO. 1 TANK FOR CIRCULATION TREATMENT OF CO2 ABSORBING LIQUID
C2; NO. 2 TANK FOR CIRCULATION TREATMENT OF CO2 ABSORBING LIQUID
V1; CIRCULATION LIQUID INLET/OUTLET VALVE OF NO. 1 TANK
V2; CIRCULATION LIQUID INLET/OUTLET VALVE OF NO. 2 TANK
F1; FIRST PACKED BED
F2; SECOND PACKED BED
G; PURIFIED EXHAUST GAS OF COMBUSTION EXHAUST GAS
G1; PURIFIED EXHAUST GAS BLOWING DEVICE
G2; TREATED GAS OUTLET
P1; CO2 ABSORBING LIQUID REPLENISHMENT PUMP
P2; CO2 ABSORBING LIQUID CIRCULATION PUMP
P3; TREATED LIQUID REMOVAL PUMP
P4; COMBUSTION EXHAUST GAS BLOWER
HC; HEAT EXCHANGER FOR COOLING

L1; SYNTHETIC CAUSTIC SODA AQUEOUS SOLUTION TRANSFER LINE
L2; CO2 ABSORBING LIQUID REPLENISHMENT LINE
L3; CO2 ABSORBING LIQUID EXTRACTION LINE
L4; CO2 ABSORBING LIQUID CIRCULATION LINE
L5; CO2 ABSORBING LIQUID BLOWING LINE
L6; TREATED GAS INTRODUCTION LINE
L7; TREATED LIQUID SODIUM CARBONATE AQUEOUS SOLUTION EXTRACTION LINE
L8; TRANSFER LINE OF TREATED LIQUID SODIUM CARBONATE AQUEOUS SOLUTION TO STORAGE TANK W1
E; SYNTHETIC CAUSTIC SODA AQUEOUS SOLUTION STORAGE TANK
S1; pH MEASURING DEVICE
T1; TEMPERATURE MEASURING DEVICE
W; SYNTHETIC CAUSTIC SODA AQUEOUS SOLUTION BLOWING DEVICE
W1; SODIUM CARBONATE AQUEOUS SOLUTION STORAGE TANK

TREATMENT METHOD FOR REDUCING CARBON DIOXIDE EMISSION OF COMBUSTION EXHAUST GAS

CROSS REFERENCE TO RELATED APPLICATION

This Application is a 371 of PCT/JP2019/015877 filed on Apr. 11, 2019 which, in turn, claimed the priority of Japanese Patent Application No. 2018-096686 filed on May 19, 2018, both applications are incorporated herein by reference.

TECHNICAL FIELD

The present invention relates to a method for refining natural sodium carbonate ore, a caustic soda synthesis method for synthesizing a caustic soda aqueous solution from a natural sodium carbonate ore, and a treatment method for reducing carbon dioxide emission of combustion exhaust gas including a caustic soda synthesis step, a treatment step of reducing carbon dioxide emission of combustion exhaust gas, and a recycling step.

BACKGROUND ART

In the related art, as a treatment method for reducing carbon dioxide emission of combustion exhaust gas, energy saving measures for suppressing consumption of fuel and reducing generation of combustion exhaust gas, and purchase of a carbon coupon based on the Kyoto Protocol are mainly used. In addition, as a treatment method to reduce carbon dioxide emissions by directly absorbing carbon dioxide of combustion exhaust gas using a carbon dioxide absorbing agent, a CCS method for isolating and storing carbon dioxide, which consists of a technique for separating and collecting carbon dioxide from combustion exhaust gas with high purity using a special carbon dioxide absorbing agent, and a technique for storing the collected carbon dioxide by injecting it into bedrock of underground or seabed has been known. However, there are still problems in the safety after storage and selection of reserves.

For example, Patent Literatures 1 and 2 disclose a treatment method for reducing carbon dioxide emission of combustion exhaust gas using a caustic soda aqueous solution as a carbon dioxide absorbing liquid. Patent Literature 1 is a method for producing a sodium carbonate aqueous solution by bringing the combustion exhaust gas of a heavy oil boiler into gas-liquid contact with a caustic soda aqueous solution, and the caustic soda aqueous solution absorbs carbon dioxide in the exhaust gas, which reduces carbon dioxide emission of combustion exhaust gas, and thus is a treatment method for reducing the carbon dioxide emission by merely producing a sodium carbonate aqueous solution.

Patent Literature 2 discloses a method for purifying exhaust gas in which combustion exhaust gas of fossil fuel is brought into gas-liquid contact with a caustic soda aqueous solution to produce sodium sulfate and sodium carbonate, desulfurization and decarburization are performed at the same time, and a sodium carbonate aqueous solution generated by absorption of carbon dioxide by the caustic soda aqueous solution is regenerated into a caustic soda aqueous solution to be recycled.

CITATION LIST

Patent Literatures

Patent Literature 1: JP 6-263433 A
Patent Literature 2: JP 4747382 B1

SUMMARY OF INVENTION

Technical Problem

Although reduction of carbon dioxide emission of greenhouse gas has become an urgent issue, a treatment method of directly absorbing and reducing carbon dioxide of combustion exhaust gas is still under development as described above. The reason for this is the economics of treatment cost. In this regard, an object of the present invention is to develop a treatment method for reducing carbon dioxide emission which creates economic effects while reducing the carbon dioxide emission of combustion exhaust gas.

In addition, caustic soda is also used in various situations, such as when carbon dioxide in exhaust gas is absorbed with a caustic soda aqueous solution and immobilized as sodium carbonate. Further, another object of the present invention is to provide a method for efficiently producing sodium carbonate ($Na_2CO_3$) using natural sodium carbonate ore consisting of naturally derived $Na_2CO_3$ and $NaHCO_3$. Moreover, still another object of the present invention is to provide a method for efficiently obtaining sodium bicarbonate ($NaHCO_3$) using natural sodium carbonate ore as a raw material.

Solution to Problem

In order to realize the treatment of reducing carbon dioxide emission of combustion exhaust gas in the above-mentioned problem, the present invention has the following features.

1. Economic effects are created by adding a recycling step of producing a synthetic sodium carbonate product and a sodium bicarbonate product by performing a treatment of reducing carbon dioxide emission with a synthetic caustic soda aqueous solution as a carbon dioxide absorbing liquid, and using a synthetic sodium carbonate aqueous solution discharged as a treated liquid as a raw material, in a treatment step of reducing carbon dioxide emission of combustion exhaust gas.

However, in order to continue the treatment of reducing carbon dioxide emission, it is necessary to continue to supply and replenish the recycled sodium carbonate aqueous solution. Therefore, the present invention also provides the following method as a countermeasure.

2. That is, electrolytic caustic soda has been used for the caustic soda aqueous solution of the carbon dioxide absorbing liquid in the related art. Since the electrolytic caustic soda is produced by a method for electrolyzing salt water, there is a problem in that power consumption during production is large and, therefore, the carbon dioxide emission generated at the power plant is also large. Therefore, from the viewpoint that it is desirable to use a synthetic caustic soda aqueous solution produced by a chemical synthesis method with low power consumption and low carbon dioxide load as the carbon dioxide absorbing liquid, the present invention also provides a method for procuring the synthetic caustic soda aqueous solution.

Thus, in the present invention, even if the synthetic sodium carbonate aqueous solution, in which the synthetic caustic soda aqueous solution discharged after the carbon dioxide absorption treatment absorbs carbon dioxide and becomes a treated liquid, is used as a raw material for the production of synthetic sodium carbonate and sodium bicarbonate products, means for continuously supplying the caustic soda aqueous solution in the carbon dioxide absorbing liquid to the treatment step of reducing carbon dioxide emission (Problem 1), and use the synthetic caustic soda aqueous solution produced by chemical synthesis for the caustic soda aqueous solution of carbon dioxide absorbing liquid (Problem 2) have been solved by finding the following treatment method for reducing carbon dioxide emission of combustion exhaust gas.

That is, there is provided a treatment method for reducing carbon dioxide emission of combustion exhaust gas using a caustic soda aqueous solution as a carbon dioxide absorbing liquid, the method includes a caustic soda synthesis step, a treatment step of reducing carbon dioxide emission of combustion exhaust gas, and a recycling step, wherein the caustic soda synthesis step is a step in which a caustic soda aqueous solution and calcium carbonate precipitate are generated by a causticization reaction with slaked lime by using a natural sodium carbonate aqueous solution prepared by dissolving refined powder of sodium carbonate ore in water, and are subjected to solid-liquid separation to obtain a synthetic caustic soda aqueous solution, the treatment step of reducing carbon dioxide emission of combustion exhaust gas is a step in which the synthetic caustic soda aqueous solution generated in the caustic soda synthesis step and purified combustion exhaust gas are brought into gas-liquid countercurrent contact so that carbon dioxide in the exhaust gas is reduced by being absorbed by the synthetic caustic soda aqueous solution and immobilized as synthetic sodium carbonate.

The treatment method for reducing carbon dioxide emission further includes a recycling step, and the recycling step can include a synthetic sodium carbonate production step and a sodium bicarbonate production step, and uses the synthetic sodium carbonate aqueous solution, in which the synthetic caustic soda discharged from the treatment step of reducing carbon dioxide emission of combustion exhaust gas absorbs carbon dioxide and becomes a treated liquid, as a raw material.

It is possible to realize the treatment method for reducing carbon dioxide emission of combustion exhaust gas, in which in the recycling step, the synthetic sodium carbonate production step is a step of using a synthetic sodium carbonate aqueous solution, in which the synthetic caustic soda aqueous solution discharged from the treatment step of reducing carbon dioxide emission of combustion exhaust gas absorbs carbon dioxide and becomes a treated liquid, as a raw material, and concentrating and drying to produce a synthetic sodium carbonate powder product.

It is possible to realize the treatment method for reducing carbon dioxide emission of combustion exhaust gas, in which in the recycling step, the sodium bicarbonate production step is a step of ventilating purified exhaust gas of the combustion exhaust gas into a synthetic sodium carbonate aqueous solution, in which the synthetic caustic soda aqueous solution discharged from the treatment step of reducing carbon dioxide emission of combustion exhaust gas absorbs carbon dioxide and becomes a treated liquid to be carbonized to form sodium bicarbonate, thereby producing sodium bicarbonate and sesquicarbonate soda products.

It is possible to realize the treatment method for reducing carbon dioxide emission of combustion exhaust gas, in which in the caustic soda synthesis step, the calcium carbonate precipitate obtained by solid-liquid separation of the caustic soda aqueous solution and the calcium carbonate precipitate produced by the causticization reaction is set as light calcium carbonate by washing the attached caustic soda with water and drying, and alkaline drainage generated by a water washing treatment is recycled to in the aqueous solution preparation step of sodium carbonate ore.

It is possible to realize the treatment method for reducing carbon dioxide emission of combustion exhaust gas, in which in the caustic soda synthesis step, the natural sodium carbonate aqueous solution is a natural sodium carbonate aqueous solution obtained by dissolving natural sodium carbonate powder obtained by refining sodium carbonate ore in water, and the sodium carbonate ore is a carbonate ore such as trona mainly consisting of dihydrate sodium carbonate and sodium bicarbonate, and having a condensate with a composition ratio of 1:1.

In the present invention, in order to solve any one of the above problems, there is provided a method for refining natural sodium carbonate ore that can efficiently convert a sodium bicarbonate component of the natural sodium carbonate ore into sodium carbonate. This refining method is a method for refining natural sodium carbonate ore includes a pulverization step of pulverizing natural sodium carbonate ore, a conversion step of dissolving the pulverized natural sodium carbonate ore in a caustic soda aqueous solution to convert the sodium bicarbonate as a component into sodium carbonate, and a filtration step of filtering the aqueous solution after conversion and removing water-insoluble components to obtain a natural sodium carbonate aqueous solution.

In the present invention, in order to solve any one of the above problems, there is provided a caustic soda synthesis method for obtaining caustic soda and calcium carbonate using the natural sodium carbonate aqueous solution obtained by the method for refining natural sodium carbonate ore.

That is, there is provided a caustic soda synthesis method for synthesizing a caustic soda aqueous solution from a natural sodium carbonate ore, the method including a causticization reaction step of generating a caustic soda aqueous solution and calcium carbonate precipitate by a causticization reaction of adding slaked lime to the natural sodium carbonate aqueous solution obtained by being refined by the method for refining the natural sodium carbonate ore of the present invention; a solid-liquid separation step of performing solid-liquid separation on the caustic soda aqueous solution and the calcium carbonate precipitate; and a step of recycling all or a part of caustic soda aqueous solution obtained by the solid-liquid separation, and/or all or a part of alkaline drainage obtained by washing calcium carbonate obtained by the solid-liquid separation with water into the conversion step.

In the present invention, in order to solve at least one of the above problems, there is also provided a method for producing sodium bicarbonate using a natural sodium carbonate aqueous solution obtained by refining natural sodium carbonate. That is, there is provided a method for producing sodium bicarbonate, the method including a sodium bicarbonate production step of refining sodium bicarbonate by reacting carbon dioxide with a part of natural sodium carbonate aqueous solution obtained by refining natural sodium carbonate, wherein the carbon dioxide used is carbon dioxide produced by roasting limestone. In such a step, the limestone is roasted to produce carbon dioxide and quicklime, and by hydrating the quicklime, slaked lime can be obtained so as to be used in the causticization reaction step.

Advantageous Effects of Invention

According to the present invention, it is possible to generate sodium carbonate ($NaCO_3$) without requiring a heat treatment by performing a conversion step of dissolving the pulverized natural sodium carbonate ore in a caustic soda aqueous solution to convert the sodium bicarbonate as a component into sodium carbonate Moreover, from the viewpoint that as compared to the heat treatment such as calcination, the yield of sodium carbonate ($NaCO_3$) from natural sodium carbonate can be increased, it is possible to provide a method for efficiently generating sodium carbonate ($Na_2CO_3$) using a natural sodium carbonate ore composed of naturally-occurring $Na_2CO_3$ and $NaHCO_3$ can be provided.

Further, when generating sodium bicarbonate by performing the carbonation on the generated sodium carbonate ($Na_2CO_3$) with carbon dioxide, carbon dioxide produced by roasting limestone is used as the carbon dioxide, and if slaked lime produced by hydrating quick lime generated by roasting the limestone is used in the causticization reaction of sodium carbonate, a method for producing a circulating caustic soda that effectively uses the generated components can be realized. In this case, a method for efficiently obtaining sodium bicarbonate using natural sodium carbonate ore as a raw material can be provided.

According to the treatment method for reducing carbon dioxide emission of combustion gas of the present invention, by providing a caustic soda synthesis step on-site using natural sodium carbonate aqueous solution and slaked lime powder prepared by dissolving powder of refined sodium carbonate ore in water, a carbon dioxide absorbing liquid of a synthetic caustic soda aqueous solution can be supplied to the treatment step of reducing carbon dioxide emission of combustion exhaust gas. In addition, since the synthetic sodium carbonate aqueous solution, in which the synthetic caustic soda aqueous solution discharged from the same step absorbs carbon dioxide and becomes a treated liquid can be regenerated into the caustic soda aqueous solution in the caustic soda synthesis step, by supplying slaked lime powder to the caustic soda synthesis step, the reduced carbon dioxide can be immobilized to calcium carbonate to continue the treatment of reducing carbon dioxide emission of exhaust gas.

Furthermore, when the synthetic sodium carbonate aqueous solution of the treated liquid is recycled and used as a raw material for producing a synthetic sodium carbonate product and a sodium bicarbonate product, by replenishing natural sodium carbonate aqueous solution from the natural sodium carbonate aqueous solution storage tank to the caustic soda synthesis step, the synthetic caustic soda aqueous solution of carbon dioxide absorbing liquid is supplied to the treatment step of reducing carbon dioxide emission of combustion exhaust gas to continue the treatment of reducing carbon dioxide emission of a predetermined amount of combustion exhaust gas.

Thus, according to the treatment method for reducing carbon dioxide emission of combustion gas of the present invention, the treatment of reducing carbon dioxide emission of combustion exhaust gas can be continued in such a manner that the caustic soda synthesis step is provided, synthetic caustic soda aqueous solution produced on-site using refined sodium carbonate ore powder as a raw material is used as the carbon dioxide absorbing liquid, the synthetic sodium carbonate aqueous solution of treated liquid that has been reduced by absorbing carbon dioxide in the treatment step of reducing carbon dioxide emission of combustion exhaust gas is recycled into synthetic caustic soda in the caustic soda synthesis step, and the synthetic caustic soda aqueous solution is allowed to circulate by recycling in the treatment step of reducing carbon dioxide emission. In addition, it is possible to provide the treatment method for reducing carbon dioxide emission of combustion exhaust gas which can simultaneously produce a synthetic sodium carbonate product and a sodium bicarbonate product by recycling the synthetic sodium carbonate aqueous solution of the treated liquid discharged from the treatment step of reducing carbon dioxide emission.

A method for producing sodium bicarbonate using the sodium carbonate aqueous solution as a raw material can be performed by blowing and carbonating the purified exhaust gas of combustion exhaust gas into the sodium carbonate aqueous solution as shown in the following (Formula 1). At this time, there is an effect of reducing 1 mol of carbon dioxide of combustion exhaust gas with respect to 1 mol of sodium carbonate.

$$Na_2CO_3 + CO_2 + H_2O \rightarrow 2NaHCO_3 \qquad \text{(Formula 1)}$$

According to the caustic soda synthesis step, the synthetic caustic soda aqueous solution can be supplied by providing the caustic soda synthesis step on-site in the treatment step of reducing carbon dioxide emission of the combustion exhaust gas, so that economic effects can be achieved by simplifying transportation and use of storage tanks as compared to the case of purchasing liquid caustic soda to use.

In the caustic soda synthesis step, since the calcium carbonate precipitate formed as a by-product in the causticization reaction treatment becomes light calcium carbonate when washed with water and dried, it can be commercialized. At that time, since the alkaline drainage generated by the water washing treatment is recycled in the aqueous solution preparation step of the natural sodium carbonate ore to prepare the natural sodium carbonate aqueous solution, it is possible to create a resource saving effect and an economic effect by water saving.

The treatment method for reducing carbon dioxide emission of combustion exhaust gas according to the present invention is a cost-effective treatment method for reducing carbon dioxide emission that has realized reduction of carbon dioxide emission of combustion gas while mass-producing synthetic sodium carbonate products, sodium bicarbonate products, and synthetic caustic soda by a simpler method than an ammonia soda method (Solvay method) by including a caustic soda synthesis step using a natural sodium carbonate aqueous solution and a step of recycling the synthetic sodium carbonate aqueous solution, in which the synthetic caustic soda aqueous solution of the carbon dioxide absorbing liquid has absorbed carbon and become a treated liquid.

The present invention has been expected to exhibit a large economic effect by establishing a new industry paradigm for reducing dioxide emission of combustion exhaust gas in cooperation with mainly factories having large-scaled carbon dioxide emission sources, and local industries.

BRIEF DESCRIPTION OF DRAWINGS

FIG. 2 is a caustic soda synthesis apparatus according to the present embodiment and a process flow chart thereof.

FIG. 3 is a gas-liquid contact reaction tower model according to the present embodiment and a process flow chart thereof.

DESCRIPTION OF EMBODIMENTS

Figure 1:
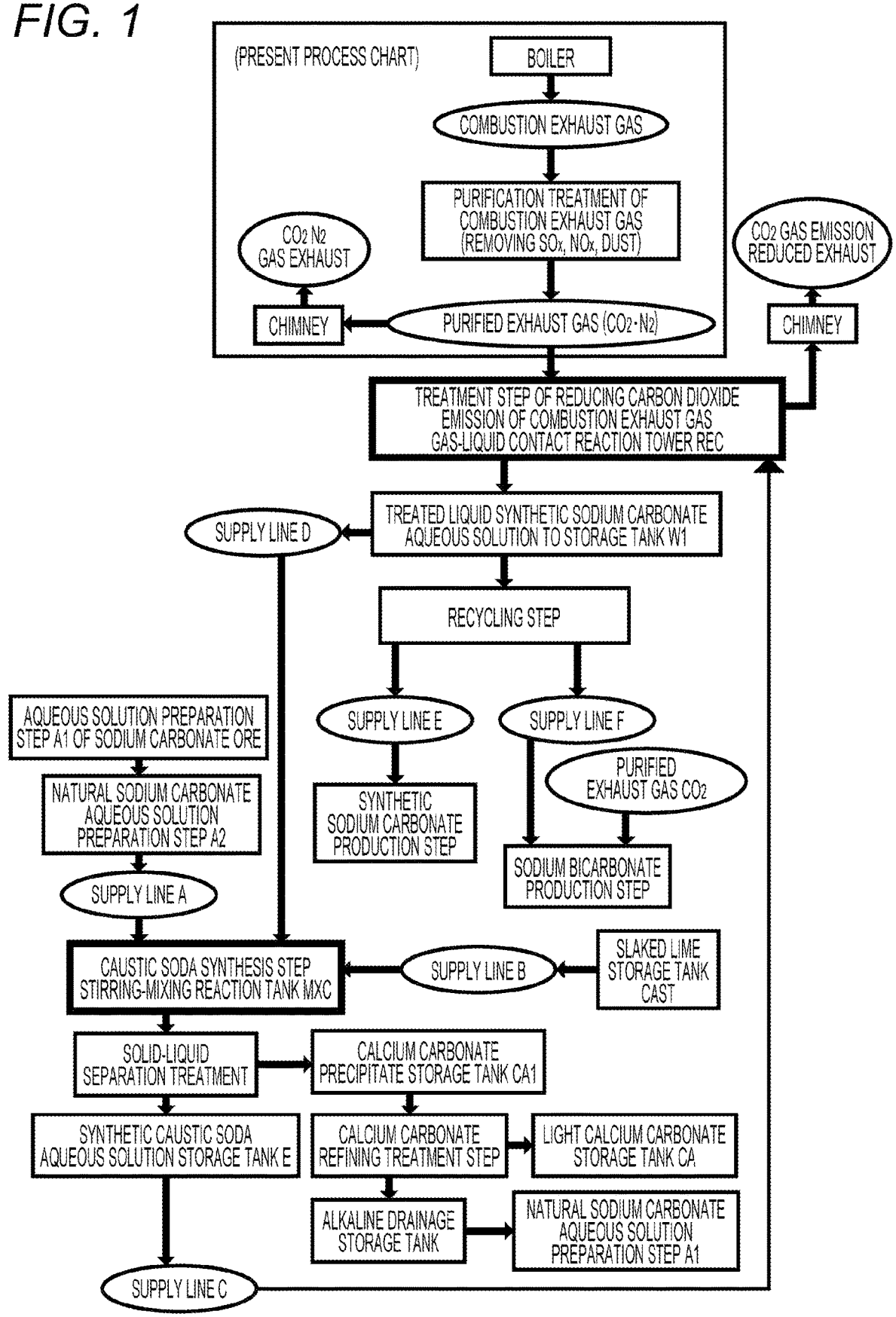
FIG. 1 is a process chart of a treatment method for reducing carbon dioxide emission of combustion exhaust gas according to the present embodiment.

Hereinafter, a treatment method and apparatus for reducing carbon dioxide emission of combustion exhaust gas according to the present embodiment will be described with reference to the drawings.

That is, it has been known that a caustic soda aqueous solution is suitable as a carbon dioxide absorbing liquid for absorbing and immobilizing carbon dioxide of combustion exhaust gas into an aqueous solution. However, the caustic soda used was electrolytic caustic soda produced by an electrolysis method of salt water.

The electrolytic caustic soda consumes a lot of power during production, and emits a large amount of carbon dioxide generated in a thermal power plant to obtain a large amount of power. However, in order to realize low carbonization, using electrolytic caustic soda for preparing a carbon dioxide absorbing liquid was reconsidered.

In addition, it was considered that there was a need to use synthetic caustic soda, and as a result of investigating inexpensive raw material carbonates, it was found that carbonate ores include sodium carbonate ores, and as a result of further investigation, it was found that there are many sodium carbonate ores, among them, the trona ore consisting of sodium carbonate and sodium bicarbonate exists in a huge deposit in the United States, and natural soda ash (natural sodium carbonate) mined and refined has been imported as an inexpensive industrial product.

It was considered that if the caustic soda was synthesized using this natural soda ash as a raw material, a carbon dioxide absorbing liquid using energy-saving and low carbon synthetic caustic soda can be produced with the electrolytic caustic soda.

That is, a production method for obtaining a synthetic caustic soda aqueous solution has completed in such a manner that when natural soda ash $Na_2CO_3$ is dissolved in water to prepare a natural sodium carbonate aqueous solution, and using a stirring-mixing tank, slaked lime $Ca(OH)_2$ powder is added and stirred and mixed while stirring the natural sodium carbonate aqueous solution, a synthetic caustic soda (NaGH) aqueous solution and a calcium carbonate ($CaCO_3$) precipitate are generated by a causticization reaction of the following (Formula 2), and these are subjected to solid-liquid separation, thereby obtaining a synthetic caustic soda aqueous solution.

$$Na_2CO_3 + Ca(OH)_2 \rightarrow 2NaOH + CaCO_3 \quad \text{(Formula 2)}$$

Furthermore, in the present invention, it has also been found that a sodium bicarbonate component is converted into sodium carbonate using a caustic soda aqueous solution without refining sodium carbonate ore consisting of $Na_2CO_3$ and $NaHCO_3$ into natural soda ash. That is, it is a method in which ore powder obtained by pulverizing sodium carbonate ore is dissolved in a caustic soda aqueous solution, and insoluble impurities are filtered and removed to be refined. In this method, the reaction of the following formula (Formula 3) in which sodium bicarbonate of the ore component is converted into sodium carbonate with a caustic soda aqueous solution is used.

$$NaHCO_3 + NaOH \rightarrow Na_2CO_3 + H_2O \quad \text{(Formula 3)}$$

For example, when trona ore powder ($Na_2CO_3$, $NaHCO_3$, $2H_2O$) is used as sodium carbonate ore powder and dissolved in a caustic soda aqueous solution, as shown in the following formula (Formula 4), 1 mol to 2 mol of sodium carbonate can be obtained.

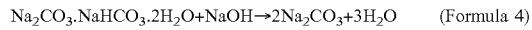

$$Na_2CO_3 \cdot NaHCO_3 \cdot 2H_2O + NaOH \rightarrow 2Na_2CO_3 + 3H_2O \quad \text{(Formula 4)}$$

On the other hand, in a case where natural soda ash is refined by heating the trona ore consisting of sodium carbonate and sodium bicarbonate as described above, as shown in the following formula (Formula 5), 1.5 mol of sodium carbonate and 1 mol of carbon dioxide are generated.

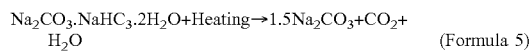

$$Na_2CO_3 \cdot NaHC_3 \cdot 2H_2O + \text{Heating} \rightarrow 1.5Na_2CO_3 + CO_2 + H_2O \quad \text{(Formula 5)}$$

Therefore, in the present invention, rather than using natural sodium carbonate ash, converting sodium bicarbonate to sodium carbonate using a caustic soda aqueous solution can suppresses carbon dioxide emissions and increase the amount of sodium carbonate generated.

On the other hand, in order to reduce the carbon dioxide of the exhaust gas, a large amount of carbon dioxide absorbing liquid is required, and the use of a large amount of water leads to an increase in the size of treatment equipment, and thus in consideration that if the synthetic sodium carbonate aqueous solution, in which the synthetic caustic soda aqueous solution of the carbon dioxide absorbing liquid has absorbed carbon and become a treated liquid, is regenerated into a caustic soda aqueous solution, an increase in the size of the equipment can be avoided, the regenerating method has investigated and examined.

As a result, a synthetic caustic soda aqueous solution is prepared by a causticizing treatment of adding slaked lime powder to the synthetic sodium carbonate solution, in which the carbon dioxide absorbing liquid of the synthetic caustic soda aqueous solution absorbs the carbon dioxide of the combustion exhaust gas and become the treated liquid, and stirring and mixing the mixture so as to be recycled in a treatment step of reducing carbon dioxide emission of exhaust gas, and thereby it is possible to suppress the amount of water used.

However, in order to make the calcium carbonate precipitate by-produced by the causticizing treatment into light calcium carbonate, it is necessary to wash with water and dry the caustic soda adhering to the precipitate, and the alkaline drainage generated at this time cannot be drained as it is. Therefore, in this embodiment, a method for using alkaline drainage is examined.

It has been found that since the natural sodium carbonate aqueous solution used in a caustic soda synthesis step is alkaline, there is no problem even if flush drainage is used as water for dissolving natural sodium carbonate powder. Thus, the flush drainage is recycled in a water tank for dissolving natural sodium carbonate powder so as to obtain cost reduction for the treatment of reducing carbon dioxide emission by saving water and economic effects by saving resources and energy.

Furthermore, the synthetic sodium carbonate aqueous solution in which the synthetic caustic soda aqueous solution absorbs carbon dioxide and become the treated liquid is made into a resource to complete the production of a synthetic sodium carbonate product and a sodium bicarbonate product.

Next, each treatment process will be described in detail with reference to the process chart of the treatment method for reducing carbon dioxide emission of combustion exhaust gas according to the present embodiment as illustrated in FIG. 1.

(1) A caustic soda synthesis step is started to generate a synthetic caustic soda aqueous solution.

First, an aqueous solution prepared in a predetermined concentration by dissolving natural sodium carbonate powder obtained by refining sodium carbonate ore trona ore in water in a sodium carbonate ore aqueous solution preparation step A1 is stored in a natural sodium carbonate aqueous solution storage tank A2. In the natural sodium carbonate aqueous solution stored in this natural sodium carbonate aqueous solution storage tank A2, natural sodium carbonate ash can be used, and preferably, a natural sodium carbonate aqueous solution in which natural sodium carbonate powder is dissolved in a caustic soda aqueous solution and a sodium bicarbonate component is converted to sodium carbonate is used.

Next, a predetermined amount of the natural sodium carbonate aqueous solution is transferred from the natural sodium carbonate aqueous solution storage tank A2 to a stirring-mixing reaction tank MXC in the caustic soda synthesis step through a supply line A, and under the stirring, a predetermined amount of slaked lime powder is charged from a slaked lime storage layer CAST into the stirring and mixing reaction tank MXC through a supply line B, and the mixture is stirred and mixed at a predetermined temperature for a predetermined time to generate a synthetic caustic soda aqueous solution and calcium carbonate precipitate.

The following reaction (Formula 2) occurs in the stirring-mixing tank.

$$Na_2CO_3 + Ca(OH)_2 \rightarrow 2NaOH + CaCO_3 \quad \text{(Formula 2)}$$

The higher the reaction temperature, the faster the reaction rate, and the heating temperature is 30° C. to 90° C., and is preferably 50° C. to 70° C. The end point of the reaction is when a pH value reaches 12.5 to 14.0.

The synthetic caustic soda aqueous solution and calcium precipitate of the product are subjected to a solid-liquid separation treatment, the synthetic caustic soda aqueous solution is stored in a synthetic caustic soda aqueous solution storage tank E, and the calcium carbonate precipitate is stored in a calcium carbonate precipitate storage tank CA1.

(2) A treatment step of reducing carbon dioxide emission of combustion exhaust gas is started.

The synthetic caustic soda aqueous solution (pH value 12.5 to 14.0) is transferred from the synthetic caustic soda aqueous solution storage tank E to a gas-liquid contact reaction tower REC of the treatment step of reducing carbon dioxide emission of the combustion exhaust gas through a supply line C, the synthetic caustic soda aqueous solution is showered from the upper portion of the reactor, and purified exhaust gas obtained by purifying the combustion exhaust gas in a step to be treated is introduced from the lower portion of the reactor, and brought into gas-liquid contact with the combustion exhaust gas. When the synthetic caustic soda aqueous solution absorbs the carbon dioxide in the exhaust gas and the carbon dioxide absorbing liquid (synthetic caustic soda aqueous solution) becomes a treated liquid, this treated liquid is extracted from the gas-liquid contact reaction tower REC as a synthetic sodium carbonate aqueous solution of the treated liquid, and is stored in a synthetic sodium carbonate aqueous solution storage tank W1 for treated liquid.

The following reaction (Formula 6) occurs in the gas-liquid contact tower.

$$2NaOH + CO_2 \rightarrow Na_2CO_3 + H_2O \quad \text{(Formula 6)}$$

Regarding the reaction temperature of the above (Formula 6), as the temperature increases, the solubility of carbon dioxide decreases and the carbon dioxide absorption efficiency of caustic soda aqueous solution decreases, and thus the reaction is preferably performed at ordinary temperature.

The end point of the reaction is the time when the pH value of the circulating carbon dioxide absorbing liquid is lowered, but if it is excessively low, sodium bicarbonate is synthesized and the solubility of sodium carbonate is lowered, so that precipitates are deposited to block a packed bed, which is not preferable. Therefore, a preferable pH value is 10.5 to 11.0.

Then, after the synthetic sodium carbonate aqueous solution of the treated liquid is extracted, the synthetic caustic soda aqueous solution of a new carbon dioxide absorbing liquid is transferred from the synthetic caustic soda aqueous solution storage tank E to the gas-liquid contact reaction tower REC through the supply line C so as to continue to perform the treatment of reducing carbon dioxide emission of the combustion exhaust gas.

(3) A synthetic sodium carbonate aqueous solution that becomes a treated liquid is regenerated into a caustic soda aqueous solution.

The synthetic sodium carbonate aqueous solution is transferred from the synthetic sodium carbonate aqueous solution storage tank W1 for treated liquid to the stirring-mixing reaction tank MXC in the caustic soda synthesis step through a supply line D, slaked lime powder of slake line storage tank CAST is charged from the supply line B into the stirring-mixing reaction tank, the mixture is stirred and mixed to generate the caustic soda aqueous solution and the calcium carbonate precipitate, and the caustic soda aqueous solution obtained by solid-liquid separation is stored in the synthetic caustic soda aqueous solution storage tank E.

At this time, since there is a shortage of the synthetic sodium carbonate aqueous solution of the treated liquid that is transferred from the synthetic sodium carbonate aqueous solution storage tank W1 of the treated liquid to the caustic soda synthesis step through the supply line D, the amount of regenerated caustic soda aqueous solution required to circulate the regenerated caustic soda aqueous solution is generated by transferring and replenishing the shortage from the natural sodium carbonate aqueous solution storage tank A2 to the caustic soda synthesis step through the supply line A so that a treatment step of reducing carbon dioxide emission of combustion exhaust gas and a recycling step are operated simultaneously.

The reaction occurring in the stirring-mixing tank is the same as in the above (Formula 1), and the reaction end point is also determined in the same manner.

The treatment of reducing carbon dioxide emission of combustion exhaust gas is continued by transferring the regenerated caustic soda aqueous solution stored in the storage tank E from the storage tank E to the treatment step of reducing carbon dioxide emission of the combustion exhaust gas through the supply line C, and circulating the regenerated caustic soda aqueous solution.

(4) A synthetic sodium carbonate aqueous solution that becomes a treated liquid is used as a raw material for a recycling step.

The synthetic sodium carbonate aqueous solution is transferred from the synthetic sodium carbonate aqueous solution storage tank W1 of the treated liquid to a synthetic sodium carbonate production step through a supply line E in the recycling step to produce a synthetic sodium carbonate product.

Moreover, the synthetic sodium carbonate aqueous solution is transferred to the sodium bicarbonate production step through a supply line F, and carbonates with the carbon dioxide of combustion exhaust gas to produce sodium bicarbonate. When generating synthetic sodium carbonate, it is carried out by gas-liquid contact reaction between the caustic soda aqueous solution and carbon dioxide, and the pH value of a reaction aqueous solution decreases as the caustic soda aqueous solution reacts with carbon dioxide in a gas-liquid contact to produce sodium carbonate, and when the reaction proceeds and the pH value becomes 9.5 or less, a sparingly soluble sodium bicarbonate precipitate is generated. Therefore, in the production stage of the synthetic sodium carbonate aqueous solution of the treated liquid, the generation of synthetic sodium carbonate ($Na_2CO_3$) is controlled by setting the pH of the end point of the gas-liquid contact reaction to 10.5 to 11.0. In this way, carbon dioxide is further blown into the synthetic sodium carbonate aqueous solution extracted from a pH range of the generation reaction of the synthetic sodium carbonate for carbonation, so that the pH value of the aqueous solution is further lowered, sodium bicarbonate can be precipitated at 9.5 to 8.5, and the precipitate is filtered off and dried to produce a product. This generation reaction of the sodium bicarbonate occurs at ordinary temperature and ordinary pressure. Increasing the reaction temperature is not preferable because the solubility of carbon dioxide decreases, and a normal carbonation reaction occurs under ordinary pressure.

(5) A calcium carbonate precipitate is refined and commercialized as light calcium carbonate.

The calcium carbonate precipitate is extracted from the calcium carbonate precipitation storage tank CA in the caustic soda synthesis step to a refining treatment step, washed with water, and dried so as to be commercialized as light calcium carbonate.

At this time, the alkaline drainage generated by washing with water is recycled to the aqueous solution preparation step A1 of sodium carbonate ore to obtain water for dissolving natural sodium carbonate powder.

Example 1

Next, an experimental example will be described with reference to FIGS. 2 and 3. In the present example, the combustion exhaust gas was purified exhaust gas obtained by desulfurization, denitration, and dust removal from a heavy oil cooking boiler. Moreover, natural sodium carbonate powder obtained by refining and pulverizing the trona ore was used as refined powder of sodium carbonate ore. The precipitate was analyzed by X-ray diffractometry, gas analysis was performed by absorptiometry, and an aqueous solution was analyzed by potentiometric titration.

Experimental Example 1

In FIG. 2, it was confirmed that the reaction of the following (Formula 2) occurring using synthetic sodium carbonate as a raw material also occurs in the same manner even in a case where the trona ore refined powder of the natural sodium carbonate is used as the raw material.

$$Na_2CO_3 + Ca(OH)_2 \rightarrow 2NaOH + CaCO_3 \quad \text{(Formula 2)}$$

[Experimental Conditions]

As a synthesis reaction device in a caustic soda synthesis step, 30-liter volume of a stirring-mixing reaction tank MXC equipped with a stirring device MX1, a heating device H1, and a temperature measuring device T2 was used, and 20 liters of natural sodium carbonate aqueous solution was transferred from a storage tank A2 storing a natural sodium carbonate aqueous solution prepared by dissolving 5950 g of purified trona ore powder in water to a $Na_2CO_3$ concentration of 2.8 mol/l in the aqueous solution preparation step A1 of natural sodium carbonate ore as illustrated in FIG. 1, to a measuring tank A3, measured, and stored in a sodium carbonate aqueous solution feeder A4.

On the other hand, the slaked lime powder was transferred from the slaked lime powder storage tank CAST to a measuring tank CA2 and 4165 g of slaked lime powder was measured by $Ca(OH)_2$ weight and stored in the slaked lime powder feeder CA20.

Next, the stirring device MX1 of the stirring-mixing reaction tank MXC was activated and under the stirring, 20 liters of natural sodium carbonate aqueous solution was charged into the reaction tank MXC from the feeder A4, then the aqueous solution was heated with the heating device H1, and while measuring the temperature with the temperature measuring device T2, when the temperature of the aqueous sodium carbonate solution reached 50° C., 4165 g of slaked lime powder was gradually charged from the slaked lime powder feeder CA20 for 10 minutes so that a stirring-mixing reaction treatment was continued.

[Experimental Result]

An initial reaction liquid into which the slaked lime was charged was a viscous cloudy liquid, but the viscosity decreased after 60 minutes and became a white suspension after 90 minutes. The end point of the reaction was determined as the time when the white suspension was sampled and the white precipitate was well settled and a supernatant become clear. The reaction was completed after 120 minutes.

The white suspension was transferred from a reaction treatment liquid extraction line L9 of the reaction tank MXC to a reaction treatment liquid storage tank ST1 by a transfer pump P5. The white suspension was sampled and filtered through analytical filter paper to obtain a clear aqueous solution and a white precipitate. When these were analyzed, the aqueous solution was a caustic soda aqueous solution having a concentration of 2.7 mol/l, and the white powder was calcium carbonate powder.

The white suspension was transferred from the stirring and mixing reaction treatment liquid storage tank ST1 to the solid-liquid separation step SP1, and the aqueous solution and the white precipitate were separated from each other. 20 liters of the synthetic caustic soda aqueous solution having a concentration of 2.7 mol/l obtained by the separation was stored in the storage tank NAST, and the white precipitate was stored in the calcium carbonate precipitate storage tank CA1.

20 liters of the synthetic caustic soda aqueous solution prepared in the above step was transferred from the storage tank NAST to the synthetic caustic soda aqueous solution storage tank E of the gas-liquid contact reaction tower REC in the treatment step of reducing carbon dioxide emission of combustion exhaust gas as illustrated in FIG. 3 by a transfer pump P6.

On the other hand, the calcium carbonate precipitate produced in the above step was transferred to the refining treatment step CU, and caustic soda adhering to the precipitate was washed with water and dried to obtain 5590 g of light calcium carbonate, and the obtained light calcium carbonate was stored in the light calcium carbonate storage tank CA1.

The alkaline drainage discharged by the water washing treatment in the refining treatment step CU was stored in an alkaline flush drainage storage tank REW, and transferred to the natural sodium carbonate aqueous solution preparation step A1 as illustrated in FIG. 1 to be recycled as water for dissolving trona ore powder.

Consideration of Experimental Example 1

It was confirmed that the natural sodium carbonate aqueous solution of the trona ore refined powder was converted into the synthetic caustic soda due to the causticization reaction of (Formula 2) as in the case of using the synthetic sodium carbonate aqueous solution.

Experimental Example 2

In this experimental example, it was confirmed that in the gas-liquid contact reaction tower REC in FIG. 3, a large amount of combustion exhaust gas can be treated with a small amount of treatment liquid by allowing the caustic soda aqueous solution, obtained by synthesizing the natural sodium carbonate aqueous solution with the carbon dioxide absorbing liquid as a raw material, to circulate in the gas-liquid contact reaction tower REC. The combustion exhaust gas used in this experiment was the exhaust gas after desulfurization, denitration, and dust removal treatments with the combustion exhaust gas from a heavy oil cooking boiler, and the exhaust gas with a composition of $CO_2$; 13 Vol %, $N_2$; 84 Vol %, $O_2$; 3 Vol % was used.

[Experimental Conditions]

In FIG. 3, the gas-liquid contact reaction tower is a cylindrical reaction tower having a tower diameter of 400 mm and a height of 2000 mm. In the inside of the reaction tower, a packed bed F2 in a gas-liquid contact field and a packed bed F1 for removing exhaust gas mist are provided, in which a blowing device W for showering the synthetic caustic soda aqueous solution of carbon dioxide absorbing liquid is installed in the upper space of the packed bed F2, a purified exhaust gas blowing device G1 is installed in the lower space of the packed bed F2, at the bottom of the tower below, No. 1 tank C1 and No. 2 tank C2 for a circulation treatment of 25 liter of carbon dioxide absorbing liquid are provided with a pH value measuring device S1 and a temperature measuring device T1 installed (in the drawings, although the equipment for No. 2 tank C2 is omitted, it has the same volume and is equipped with the same devices as C1), and on a top plate at the top of each tank has treatment liquid inlet/outlet valves V1 and V2, which are alternately opened and closed when the treatment liquid is replaced to circulate the carbon dioxide absorbing liquid, so that the treatment of reducing carbon dioxide emission of the combustion exhaust gas can be performed without interruption.

First, 20 liters of synthetic caustic soda aqueous solution with a concentration of 2.7 mol/l was transferred from the synthetic caustic soda aqueous solution storage tank E of the carbon dioxide absorbing liquid through a replenishment line L2 to the No. 1 tank C1 for the circulation treatment with a pump P1 of a transfer line L1, then a carbon dioxide absorbing liquid extraction line L3 was opened, the synthetic caustic soda aqueous solution passed through the heat exchanger HC set to 30° C. with the circulation pump P2 from the circulating line L4 and passed through a carbon dioxide absorbing liquid blowing line L5, 120 liters of carbon dioxide absorbing liquid was blown in like a shower from the blowing device W for 1 hour, the treatment liquid inlet/outlet valve V1 of the top plate of the No. 1 tank C1 for the treatment liquid circulation was opened (at this time, the inlet/outlet valve V2 of No. 2 tank C2 is closed) to collect the treatment liquid in C1, and the circulation of a carbon dioxide absorbing treatment liquid in the reaction tower was started by the circulation pump P1 from the absorbing liquid extraction line L3.

At the same time, with a carbon dioxide absorbing liquid transfer line switching device (not shown), the replenishment pump P1 was switched to the carbon dioxide absorbing liquid transfer line of the No. 2 tank C2 for the treatment liquid circulation, and similar to No. 1 tank C1, 20 liters of synthetic caustic soda aqueous solution was transferred from the synthetic caustic soda aqueous solution storage tank E to the No. 2 tank C2 for the treatment liquid circulation.

Subsequently, with an exhaust gas blower P4 from a treatment gas introduction line, the purified exhaust gas G of the combustion exhaust gas passed from the exhaust gas blowing device G1 into the gas-liquid contact reaction tower at a flow rate of 80 liters per hour L6 to start a gas-liquid contact reaction. The exhaust gas after the absorbing liquid absorbed carbon dioxide was discharged from the treatment gas outlet G2 to a chimney by removing the mist of the treatment liquid in the packed bed F1.

[Experimental Result]

The pH value of the treatment liquid at the start of the gas-liquid contact reaction was 14.2, and the liquid temperature was 30° C. Since the reaction of (Formula 6) was an exothermic reaction, it was controlled at 30° C. with a heat exchanger HC. In addition, the measurement was performed with the pH value measuring device S1 every 30 minutes, and the time when the pH value dropped to 10.5 to 11.0 was determined as the reaction end point.

From the fact that 12 hours after the progress of the gas-liquid contact reaction treatment, the pH value decreased to 13.7, 24 hours after the progress, the pH value decreased to 12.4, and 36 hours after the progress, the pH value decreased to 11.6, it was confirmed the synthetic caustic soda aqueous solution absorbed and reduced carbon dioxide in the exhaust gas. After that, the measurement continued, when 50 hours passed, the pH value dropped to 10.8, which was set as the end point, and the treatment liquid extraction line L3 of the No. 1 tank C1 for the circulation treatment of carbon dioxide absorbing liquid was switched to the C2 line (not shown), a circulation liquid inlet/outlet valve V1 was closed and an inlet/outlet valve V2 of the No. 2 tank C2 was opened to continue the circulation treatment of the carbon dioxide absorbing liquid by the No. 2 tank C2 for the circulation treatment.

The treatment liquid for the treatment of reducing carbon dioxide emission of the exhaust gas treated in the No. 1 tank C1 for the circulation treatment was transferred through the transfer line L8 by opening a treated liquid extraction line L7, and stored in the sodium carbonate aqueous solution storage tank W1 with an extraction pump P3. After the extraction, the No. 1 tank C1 for the circulation treatment was replenished with 20 liters of synthetic caustic soda aqueous solution of carbon dioxide absorbing liquid in the same procedure as the previous time.

The synthetic sodium carbonate aqueous solution stored in the sodium carbonate aqueous solution storage tank W1 was analyzed, and it was 20 liters of sodium carbonate aqueous solution having an aqueous solution concentration of 2.8 mol/l.

Consideration of Experimental Example 2

The result of this experiment was that combustion exhaust gas with a flow rate of 80 liters per hour was subjected to a gas-liquid contact treatment for 50 hours, so the amount of combustion exhaust gas was 4000 liters, and the fact that 20 liters of 2.8 mol/l sodium carbonate aqueous solution was produced indicates that 1020 g of 13 vol % carbon dioxide contained in this combustion exhaust gas was reduced, and the synthetic caustic soda aqueous solution of the carbon dioxide absorbing liquid used for the treatment of reducing carbon dioxide emission of the combustion exhaust gas was 20 liters. Therefore, it was confirmed that 20 liters of synthetic caustic soda aqueous solution absorbed and reduced 4000 liters of carbon dioxide of the combustion exhaust gas.

Experimental Example 3

In the gas-liquid contact reaction tower REC of FIG. 3, the synthetic sodium carbonate aqueous solution in which the synthetic caustic soda aqueous solution of the carbon dioxide absorbing liquid becomes as the treated liquid is stored in the treated liquid storage tank W1, and the synthetic caustic soda aqueous solution in the storage tank W1 is used as a raw material for synthesizing caustic soda in the caustic soda synthesis reaction tank MXC as illustrated in FIG. 2, and also as a raw material for producing synthetic sodium carbonate and sodium bicarbonate in the recycling step. Therefore, it was confirmed that in order to stably supply a predetermined amount of the caustic soda aqueous solution of the carbon dioxide absorbing liquid to the gas-liquid contact reaction tower REC, the amount of the synthetic sodium carbonate aqueous solution used in the recycling step is replenished from the natural sodium carbonate aqueous solution storage tank A2 to the stirring-mixing reaction tank MXC in the caustic soda synthesis step so as to generate a predetermined amount of aqueous caustic soda solution, so that the carbon dioxide absorbing liquid circulates between the gas-liquid contact reaction tower REC in the treatment step of reducing carbon dioxide emission of the combustion exhaust gas and the stirring-mixing reaction tank MXC in the caustic soda synthesis step to continue the treatment of reducing carbon dioxide emission of the combustion exhaust gas.

[Experimental Conditions]

In FIG. 1, from the storage tank W1 that stores 20 liters of synthetic sodium carbonate aqueous solution, which became a treated liquid, 5 liters of synthetic sodium carbonate aqueous solution was supplied to the synthetic sodium carbonate production step of the recycling step, and 5 liters of synthetic sodium carbonate aqueous solution was supplied to the sodium bicarbonate production step as raw materials.

In the synthetic sodium carbonate production step, 5 liters of the raw synthetic sodium carbonate aqueous solution was concentrated by a conventional method, dried, and pulverized to generate synthetic sodium carbonate powder. Using 5 liters of synthetic sodium carbonate aqueous solution having an aqueous solution concentration of 2.8 mol/l, 1480 g of synthetic sodium carbonate powder was obtained.

In the sodium bicarbonate production step, 5 liters of sodium carbonate aqueous solution of the raw material was charged using 10 liters of container equipped with a stirring device, and purified exhaust gas of combustion exhaust gas was blown until the initial pH value decreased from 10.8 to 9.5±0.1 through a gas pipe in an ordinary temperature/ordinary pressure environment, 2338 g of sodium bicarbonate was generated from 5 liters of synthetic sodium carbonate aqueous solution by the carbonation reaction as shown in (Formula 1) below. At this time, 606 g of carbon dioxide of combustion exhaust gas was reduced and 2378 liters of combustion exhaust gas was treated.

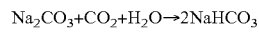
$$Na_2CO_3 + CO_2 + H_2O \rightarrow 2NaHCO_3 \quad \text{(Formula 1)}$$

On the other hand, the remaining 10 liters of sodium carbonate aqueous solution was transferred from the storage tank W1 to the stirring-mixing reaction tank MXC in the caustic soda synthesis step through the supply line D, and 10 liters were measured with a measuring instrument W2 and stored in the feeder A4.

Next, in the sodium carbonate ore aqueous solution preparation step A1, the natural sodium carbonate aqueous solution of purified trona powder prepared to 2.8 mol/l with the same concentration as the synthetic sodium carbonate in the synthetic sodium carbonate aqueous solution storage tank W1 of the treated liquid was transferred to the storage tank A2 and 10 liters of natural sodium carbonate aqueous solution was measured with a measuring instrument A3, and then 10 liters of natural sodium carbonate aqueous solution was stored in the feeder A4 and mixed with the previous synthetic sodium carbonate aqueous solution.

Next, 4165 g of slaked lime from the slaked lime powder storage tank CAST was measured in the measuring tank CA2, and then stored in the slaked lime powder feeder CA20.

Subsequently, the stirring device MX1 of the stirring-mixing reaction tower MXC was started, and while operating the stirring device, 20 liters of sodium carbonate aqueous solution of the sodium carbonate aqueous solution feeder A4 was charged into the stirring-mixing reaction tower MXC, and the sodium carbonate aqueous solution was heated with the heating device H1 to increase the temperature. When the aqueous solution temperature was raised to 50° C., 4165 g of slaked lime from the slaked lime powder feeder CA20 was gradually charged over 10 minutes to start the stirring-mixing reaction.

[Experimental Result]

An initial reaction liquid into which the slaked lime was charged was a viscous cloudy liquid, but the viscosity decreased after 60 minutes and became a white suspension after 90 minutes. The end point of the reaction was determined as the time when the white suspension was sampled and the white precipitate was well settled and a supernatant become clear. The reaction was completed after 120 minutes.

As illustrated in FIG. 2, the white suspension was transferred from the reaction treatment liquid extraction line L9 of the reaction tank MXC to the reaction treatment liquid storage tank ST1 by the transfer pump P5. The white suspension was sampled and filtered through analytical filter paper to obtain a clear aqueous solution and a white precipitate. When these were analyzed, the aqueous solution was a caustic soda aqueous solution having a concentration of 2.7 mol/l, and the white powder was calcium carbonate powder.

The white suspension was transferred from the stirring and mixing reaction treatment liquid storage tank ST1 to the solid-liquid separation step SP1, and the aqueous solution and the white precipitate were separated from each other. 20 liters of synthetic caustic soda aqueous solution with a concentration of 2.7 mol/l obtained by separation and the calcium carbonate precipitate were collected, and the caustic soda aqueous solution was stored in the storage tank NAST, and the calcium carbonate precipitate was stored in the precipitate storage tank CA1.

From the synthetic caustic soda aqueous solution storage tank NAST, 20 liters of synthetic caustic soda aqueous solution was transferred to the synthetic caustic soda aqueous solution storage tank E of the gas-liquid contact reaction tower REC with the transfer pump P6 as illustrated in FIG. 3.

The calcium carbonate precipitate was transferred to the refining treatment step CU, and caustic soda adhering to the precipitate was washed with water and dried to obtain 5590 g of light calcium carbonate, and the obtained light calcium carbonate was stored in the light calcium carbonate storage tank CA.

The alkaline drainage discharged by the water washing treatment in the refining treatment step CU was stored in an alkaline flush drainage storage tank REW, and transferred to the natural sodium carbonate aqueous solution preparation step A1 as illustrated in FIG. 1 to be recycled as water for dissolving trona ore powder.

Consideration of Experimental Example 3

It was confirmed that the caustic soda aqueous solution of the same concentration and the same amount of carbon dioxide absorbing liquid circulated between the caustic soda synthesis step and the gas-liquid contact reaction tower, and the treatment of reducing carbon dioxide emission of combustion exhaust gas was performed.

As described above, in the results of Experimental Examples 1, 2, and 3, it was confirmed that the caustic soda synthesis step, which produces synthetic caustic soda using sodium carbonate ore and limestone as raw materials, is also a caustic soda aqueous solution preparation step in which the synthetic sodium carbonate aqueous solution in which the carbon dioxide absorbing liquid has become a treated liquid is regenerated into caustic soda, and the used amount of the synthetic sodium carbonate as a raw material in the recycling step is replenished with the natural sodium carbonate aqueous solution, so that a predetermined amount of the regenerated caustic soda aqueous solution is supplied to the treatment step of reducing carbon dioxide emission of combustion exhaust gas to circulate, the treatment step of reducing carbon dioxide emission of combustion exhaust gas is a step in which the synthetic caustic soda aqueous solution of the dioxide absorbing liquid is in gas-liquid contact with the combustion exhaust gas while circulating in the reaction tower, and thus a large amount of combustion exhaust gas can be treated with a small amount of carbon dioxide absorbing liquid, and the recycling step is a step in which synthetic sodium carbonate and sodium bicarbonate products are produced using as a raw ore a synthetic sodium carbonate aqueous solution generated by absorption of carbon dioxide in combustion exhaust gas by synthetic caustic soda aqueous solution so as to contribute to reducing the cost of the treatment of reducing carbon dioxide emission of combustion exhaust gas.

Experimental Example 4

In this experimental example, it was confirmed that a treatment for converting a sodium bicarbonate component of a natural sodium carbonate ore into sodium carbonate using a caustic soda aqueous solution. That is, using 1000 g of trona ore powder having the following composition ratio, an experiment of the reaction formula (Formula 4) was conducted to convert sodium bicarbonate of the trona ore component into sodium carbonate to generate a sodium carbonate aqueous solution.

[Na2CO3.NaHCO3.2H2O+α]+NaOH→2Na2CO3+ 3H2O     (Formula 4)

The component composition ratio of 1000 g of trona ore powder used in this experimental example is as follows: $Na_2CO3$ component; 426 g, $NaHCO_3$ component; 337 g, $2H_2O$ (crystal water); 145 g (145 ml), and α (impurity); 92 g.

As an experimental apparatus, a reaction tank having a stirring device and a heating device and a volume of 3000 ml and a vacuum filtration apparatus for removing impurities were used. As experimental materials, trona ore powder [$Na_2CO_3.NaHCO_3.2H_2O+α$], reagent grade granular caustic soda, and ion-exchanged water were used. In the formula, α is an impurity.

[Experimental Conditions and Products]

Into a 3000 ml reaction tank, 1645 ml of ion-exchanged water was charged, 160 g of caustic soda was dissolved while stirring at 40° C. under ordinary pressure, and then, ion-exchanged water was added to prepare 2000 ml of caustic soda aqueous solution. Note that, the temperature condition is ordinary temperature or higher and 100° C. or lower, and the peak temperature of the solubility of sodium carbonate is 40° C., the solubility decreases if the peak temperature is lower or higher than this, and even if the temperature is increased, the solubility does not increase, and thus 20° C. to 80° C. is preferable, and 30° C. to 60° C. is particularly preferable. Then, 1000 g of trona ore powder was added and dissolved while stirring the caustic soda aqueous solution. After 60 minutes, stirring was stopped and the completely dissolved solution was extracted. The extracted aqueous solution was filtered using a filter paper for analysis with a vacuum filtration apparatus to remove impurities, thereby obtaining 2217 ml of purified solution. On the other hand, the filtered and removed filtrate was dried at 100° C., and the weight of the dried product was 90 g.

[Result of Analysis]

As a result of analyzing the produced aqueous solution (purified solution) by neutralization titration, it was a sodium carbonate aqueous solution having a sodium carbonate concentration of 3.62 mol/liter. This was 2217 ml of sodium carbonate aqueous solution consisting of 851 g of sodium carbonate, and the amount of sodium carbonate and water increased more than the amount charged. As can be seen from the following (Formula 3), the increase in sodium carbonate is the reaction of sodium bicarbonate and caustic soda to convert 337 g of sodium bicarbonate into 424 g of sodium carbonate, and the increased amount of water is attributed to 72 ml produced in the same reaction and 145 ml of trona ore crystal water.

Chemical formula $NaHCO_3 + NaOH \rightarrow Na_2CO_3 + H_2O$     (Formula 3)

337 g 160 g 424 g 72 g (72 ml)

[Experimental Result]

It was confirmed that this treatment method for obtaining a refined sodium carbonate aqueous solution by dissolving natural sodium carbonate ore powder containing a sparingly soluble sodium bicarbonate such as trona as a component in a caustic soda aqueous solution is an efficient treatment method for producing a refined sodium carbonate aqueous solution by converting the sparingly soluble sodium bicarbonate component into a soluble sodium carbonate aqueous solution and filtering and removing insoluble impurities in the generated aqueous sodium carbonate solution, which does not generate $CO_2$.

INDUSTRIAL APPLICABILITY

The present invention is a treatment method for reducing carbon dioxide emission of combustion exhaust gas to solve the urgent problem of reducing the amount of carbon dioxide emission of combustion exhaust.

Examples of combustion exhaust gas treatments includes flue gas purification treatments such as desulfurization, denitration, and dust removal, which have been put into practical use.

The present invention is a treatment method for reducing the carbon dioxide emission of the exhaust gas after the purification, and since the gas-liquid contact reaction tower used is similar in the structure to the equipment used in the flue gas desulfurization method, and there are no other facilities, it is easy to implement.

Furthermore, an efficient method of refining sodium carbonate ($Na_2CO_3$) using sodium carbonate ore consisting of naturally-occurring $Na_2CO_3$ and $NaHCO_3$ in the present invention is not limited to the treatment method for reducing carbon dioxide emission, and can be used in various fields for obtaining sodium carbonate ($Na_2CO_3$).

REFERENCE SIGNS LIST

A1 Aqueous solution preparation step of sodium carbonate ore
A2 Natural sodium carbonate aqueous solution storage tank
A3 Natural sodium carbonate aqueous solution measuring tank
A4 Sodium carbonate aqueous solution feeder
W synthetic caustic soda aqueous solution blowing device
W1 Synthetic sodium carbonate aqueous solution storage tank
W2 Synthetic sodium carbonate aqueous solution measuring tank
CAST Slaked lime storage
E synthetic caustic soda aqueous solution storage tank
CA Light calcium carbonate storage tank
CA1 Calcium carbonate precipitate storage tank
CA2 Slaked lime powder measuring tank
CA20 Slaked lime powder feeder
MXC Stirring-mixing reaction tank
MX1 Stirring device
T1, T2 Temperature measuring device
S1 pH measuring device
HC Heat exchanger for cooling
P1 CO2 absorbing liquid replenishment pump
P2 CO2 absorbing liquid circulation pump
P3 Treated liquid removal pump
P4 Combustion exhaust gas blower
P5 Stirring-mixing reaction treatment liquid transfer pump
P6 Transfer pump
NAST synthetic caustic soda aqueous solution removal tank
CU Calcium carbonate refining treatment step
REW Alkaline flush drainage storage tank
ST1 Stirring-mixing reaction treatment liquid storage tank
SP1 Solid-liquid separation step
REC Gas-liquid contact reaction tower
C1 No. 1 tank for circulation treatment of CO2 absorbing liquid
C2 No. 2 tank for circulation treatment of CO2 absorbing liquid
V1 Circulation liquid inlet/outlet valve of No. 1 tank
V2 Circulation liquid inlet/outlet valve of No. 2 tank
F1 First packed bed
F2 Second packed bed
G Purified exhaust gas of combustion exhaust gas
G1 Purified exhaust gas blowing device
G2 Treated gas outlet
L1 synthetic caustic soda aqueous solution transfer line
L2 CO2 absorbing liquid replenishment line
L3 CO2 absorbing liquid extraction line
L4 CO2 absorbing liquid circulation line
L5 CO2 absorbing liquid blowing line
L6 Treated gas introduction line
L7 Treated liquid synthetic sodium carbonate aqueous solution extraction line
L8 Transfer line of treated liquid synthetic sodium carbonate aqueous solution to storage tank W1
L9 Stirring-mixing reaction treatment liquid extraction line

The invention claimed is:

1. A caustic soda synthesis method for synthesizing a caustic soda aqueous solution from a natural sodium carbonate ore, the method comprising:
a causticization reaction step of generating a caustic soda aqueous solution and calcium carbonate precipitate by a causticization reaction of adding slaked lime to the natural sodium carbonate aqueous solution obtained by being refined by a method for refining natural sodium carbonate ore consisting of sodium carbonate and sodium bicarbonate, the method including a pulverization step of pulverizing natural sodium carbonate ore, a conversion step of dissolving the pulverized sodium carbonate ore in a caustic soda aqueous solution to convert the sodium bicarbonate as a component into sodium carbonate, and a filtration step of filtering the aqueous solution after conversion and removing water-insoluble components to obtain a natural sodium carbonate aqueous solution;
a solid-liquid separation step of performing solid-liquid separation on the caustic soda aqueous solution and the calcium carbonate precipitate; and
a step of recycling all or a part of caustic soda aqueous solution obtained by the solid-liquid separation, and/or all or a part of alkaline drainage obtained by washing calcium carbonate obtained by the solid-liquid separation with water into the conversion step.

2. The caustic soda synthesis method according to claim 1, further comprising:
a sodium bicarbonate production step of generating sodium bicarbonate by extracting a part of the natural sodium carbonate aqueous solution obtained by being refined by a method for refining natural sodium carbonate ore, the method including a pulverization step of pulverizing natural sodium carbonate ore, a conversion step of dissolving the pulverized sodium carbonate ore in a caustic soda aqueous solution to convert the sodium bicarbonate as a component into sodium carbonate, and a filtration step of filtering the aqueous solution after conversion, and removing water-insoluble components to obtain a natural sodium carbonate aqueous solution, and carbonating the extracted part with carbon dioxide,
wherein as the carbon dioxide, carbon dioxide produced by roasting limestone is used, and slaked lime produced by hydrating quicklime produced by roasting the limestone is used in the causticization reaction step.

3. A treatment method for reducing carbon dioxide emission of combustion exhaust gas using a caustic soda aqueous solution as a carbon dioxide absorbing liquid, the method comprising:
a caustic soda synthesis step; and
a treatment step of reducing carbon dioxide emission of combustion exhaust gas,
wherein the caustic soda synthesis step is a step in which a caustic soda aqueous solution and calcium carbonate precipitate are generated by a causticization reaction by adding slaked lime to a natural sodium carbonate aqueous solution prepared by dissolving refined powder of natural sodium carbonate ore in water, and are subjected to solid-liquid separation or a natural sodium carbonate aqueous solution obtained by filtering an aqueous solution in which pulverized sodium carbonate ore powder is dissolved in a caustic soda aqueous solution to convert the sodium bicarbonate as a component into sodium carbonate, and removing and refining water insoluble components to obtain a synthetic caustic soda aqueous solution, the treatment step of reducing carbon dioxide emission of combustion exhaust gas is a step in which the synthetic caustic soda aqueous solution generated in the caustic soda synthesis step and purified combustion exhaust gas are brought into gas-liquid countercurrent contact so that carbon dioxide in the exhaust gas is reduced by being absorbed by the synthetic caustic soda aqueous solution and immobilized as sodium carbonate, and in the caustic soda synthesis step, the calcium carbonate precipitate obtained by solid-liquid separation of the caustic soda aqueous solution and the calcium carbonate precipitate produced by the causticization reaction is set as light calcium carbonate by washing the attached caustic soda with water and drying, and alkaline drainage generated by a water washing treatment is recycled to in the aqueous solution preparation step of sodium carbonate ore.

4. A treatment system for reducing carbon dioxide emission of combustion exhaust gas using a caustic soda aqueous solution as a carbon dioxide absorbing liquid, the system comprising:

a caustic soda synthesis apparatus; and a treatment apparatus for reducing carbon dioxide emission of combustion exhaust gas, wherein the caustic soda synthesis apparatus is an apparatus in which a caustic soda aqueous solution and calcium carbonate precipitate are generated by a causticization reaction due to slaked lime by using a natural sodium carbonate aqueous solution prepared by dissolving refined powder of natural sodium carbonate ore in water or a natural sodium carbonate aqueous solution obtained by filtering an aqueous solution in which pulverized sodium carbonate ore powder is dissolved in a caustic soda aqueous solution to convert the sodium bicarbonate as a component into sodium carbonate, and are subjected to solid-liquid separation to obtain a synthetic caustic soda aqueous solution, the treatment apparatus of reducing carbon dioxide emission of combustion exhaust gas is an apparatus in which the synthetic caustic soda aqueous solution generated in the caustic soda synthesis apparatus and purified combustion exhaust gas are brought into gas-liquid countercurrent contact so that carbon dioxide in the exhaust gas is reduced by being absorbed by the synthetic caustic soda aqueous solution and immobilized as sodium carbonate, and in the caustic soda synthesis apparatus, the calcium carbonate precipitate obtained by solid-liquid separation of the caustic soda aqueous solution and the calcium carbonate precipitate produced by the causticization reaction is set as light calcium carbonate by washing the attached caustic soda with water and drying, and alkaline drainage generated by a water washing treatment is recycled to in the aqueous solution preparation step of sodium carbonate ore.

5. The treatment system for reducing carbon dioxide emission of combustion exhaust gas according to claim 4, further comprising:

a recycling apparatus, wherein the recycling apparatus is performed using a synthetic sodium carbonate aqueous solution in which the synthetic caustic soda aqueous solution is in gas-liquid countercurrent contact with the combustion exhaust gas to absorb carbon dioxide in the exhaust gas, and includes the following (1) a synthetic sodium carbonate production apparatus and/or (2) a bicarbonate production apparatus:

(1) the synthetic sodium carbonate production apparatus in which a synthetic sodium carbonate aqueous solution, in which the synthetic caustic soda aqueous solution absorbs carbon dioxide and becomes a treated liquid in the treatment apparatus for reducing carbon dioxide emissions of combustion exhaust gas, is used as a raw material, and concentrated and dried to produce a synthetic sodium carbonate powder product; and (2) the sodium bicarbonate production apparatus in which a synthetic sodium carbonate aqueous solution of the treated liquid discharged from the treatment step of reducing carbon dioxide emission of combustion exhaust gas is used as a raw material, and carbonized by ventilating purified exhaust gas of the combustion exhaust gas into the synthetic sodium carbonate aqueous solution to form sodium bicarbonate, thereby producing sodium bicarbonate and sesquicarbonate soda products.

* * * * *